United States Patent
Kodama et al.

[15] 3,699,188
[45] Oct. 17, 1972

[54] FIRE RESISTANT POLYMERS

[72] Inventors: Yutaka Kodama; Tsutomu Kodama, both of Toyama; Masao Nakabayashi, Namerikawa; Shigekazu Komatu, Toyama, all of Japan

[73] Assignee: Toyama Chemical Co., Ltd., Tokyo, Japan

[22] Filed: March 31, 1970

[21] Appl. No.: 24,345

[30] Foreign Application Priority Data

May 19, 1969 Japan ..................44/38023

[52] U.S. Cl. ...............260/865, 106/15 FP, 252/8.1, 260/2.5 AJ, 260/45.7 P, 260/45.8 R
[51] Int. Cl. ................................................C09k 3/28
[58] Field of Search ......260/2.5 AJ, 448.8 A, 45.7 P, 260/865; 252/811

[56] References Cited

UNITED STATES PATENTS

| | | | |
|---|---|---|---|
| 3,113,139 | 12/1963 | Birum et al. | 260/346.1 |
| 2,877,204 | 3/1959 | Duhnkrack et al. | 260/865 |
| 3,400,085 | 9/1968 | Kujawa et al. | 260/2.5 |

Primary Examiner—Donald E. Czaja
Assistant Examiner—R. A. White
Attorney—Waters, Roditi, Schwartz & Nissen

[57] ABSTRACT

Novel organic phosphorosilicon compounds are silicate of α-hydroxyphosphonate prepared by reacting a phosphorous acid triester, a carbonyl compound and a silicon compound containing at least one active chlorine atom and are effective as flame-retarding agent for inflammable high polymers, particularly synthetic resins, synthetic rubbers and paints.

3 Claims, No Drawings

FIRE RESISTANT POLYMERS

This invention relates to a novel organic phosphorosilicon compound. More particularly, this invention relates to a novel silicate of α-hydroxyphosphonate, to a process for producing the same and to a flame-retarding high polymer composition containing the same.

Although synthetic resins are widely used in various fields, they have the fatal defect that they are inflammable, by which a further development of the synthetic resins has been prevented. Therefore, many attempts have been made on flame-retarding agents for various synthetic resins.

As a result of extensive research thereon, the present inventors have found a novel compound which can impart flame-retarding or self-extinguishing properties to synthetic resins when blended with the latter.

An object of the present invention is to provide a novel, organic phosphorosilicon compound.

Another object of the present invention is to provide a novel silicate of α-hydroxyphosphonate which can impart flame-retarding or self-extinguishing properties to synthetic resins.

A further object of the present invention is to provide a process for producing a novel silicate of α-hydroxyphosphonate.

A still further object is to provide a flame-retarding composition comprising an inflammable high polymer and a novel silicate of α-hydroxyphosphonate.

Other objects and advantages of the present invention will become apparent to those skilled in the art from the following description.

The present invention provides a novel organic phosphorosilicon compound having the formula:

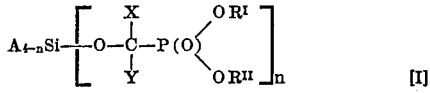

[I]

wherein A is an unsubstituted or halogen-substituted alkyl or alkoxy group having one to four carbon atoms or an unsubstituted or halogen-substituted alkenyl or alkenoxy group having two to four carbon atoms or an unsubstituted or halogen-substituted aryl, aryloxy or benzyloxy group having six to eight carbon atoms; X and Y are the same or different groups selected from hydrogen, furyl groups, alkyl groups having one to seven carbon atoms, alkenyl groups having two to seven carbon atoms and aryl groups having six to eight carbon atoms; $R^I$ and $R^{II}$ are unsubstituted or halogen-substituted alkyl groups having one to three carbon atoms or when taken together form an unsubstituted or substituted alkylene group having two to three carbon atoms; and n is an integer of 1 to 4.

The novel compound having formula [I] of the present invention is prepared by reacting a phosphorous acid triester having the formula:

[II]

wherein $R^I$ and $R^{II}$ are the same as defined above and T is an unsubstituted or halogen-substituted alkyl group having one to three carbon atoms, a carbonyl group having the formula:

[III]

wherein X and Y are the same as defined above and a silicon compound having at least one active chlorine atom and represented by the formula:

$$A_{4-n}SiCl_n \quad [IV]$$

wherein A and n are the same as defined above. Said reaction utilizes the Arbzove rearrangement peculiar to phosphorous acid triester, that is, the conversion of a phosphite into a phosphonate when the valency of phosphorus is altered from 3 to 5. The above reaction is illustrated by the following reaction formulas:

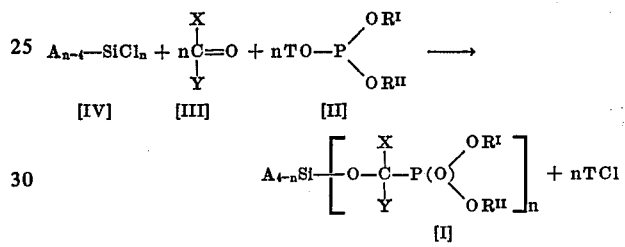

wherein A, X, Y, T, $R^I$, $R^{II}$ and n are the same as defined above.

Examples of the phosphorous acid triester used as one of the starting materials in the present invention include trimethyl phosphite, triethyl phosphite, tris-(2-chloroethyl) phosphite, tris-(2-chloropropyl) phosphite, tris-(2,3-dichloropropyl) phosphite, triphenyl phosphite, 2-methyl-4-chloromethyl-1,3,2-dioxaphospholane, 2-β-chloroethoxy-1,3,2-dioxaphospholane, 2-(2,3-dichloropropoxy)-4-methyl-1,3,2-dioxaphospholane, 2-β-chloro-ethoxyl-4-methyl-1,3,2-dioxaphospholane and the like.

The carbonyl compounds having formula [III] used in the present invention include formaldehyde, acetaldehyde, propionaldehyde, acrolein, crotonaldehyde, 2-ethylhexenal, benzaldehyde, furfural, acetone, methyl ethyl ketone, diethyl ketone, methyl iso-butyl ketone and the like.

The silicon compounds having formula [III] used in the present invention include silicon tetrachloride, methyltrichlorosilane, dimethyldichlorosilane, triethylchlorosilane, trichlorophenylsilane, triphenylchlorosilane, 2-chloroethoxy-trichlorosilane, allyloxy-trichlorosilane, bis-(2-chloroethoxy)-dichlorosilane, 2-bromoethoxy-trichlorosilane, methoxy-trichlorosilane, dimethoxy-dichlorosilane, tris-(2,3-dichloroproxy)-chlorosilane, tris-(2-bromoethoxy)-chlorosilane, ethoxy-trichlorosilane, p-chlorophenoxytri-chlorosilane, dibenzyloxy-di-chlorosilane and the like.

These compounds may be used in any combination to produce an organic phosphorosilicon compound of formula [I] suitable for the purpose of use of the product. The number of the α-bydroxyphosphonate groups present in the compound of formula [I] is determined by the number of the chlorine atoms contained in the starting silicon compound of formula [IV].

The three starting compounds of formulas [II], [III] and [IV] are exothermically reacted upon being mixed to almost quantitatively form the desired organic phosphorosilicon compound of formula [I]. The starting compounds may be mixed in the following manner: The compound of formula [II] is first mixed with the compound [IV] and the compound [III] is then added to the resulting mixture, or alternatively, the compound of formula [II] is first mixed with the compound of formula [III] and the compound of formula [IV] is then added to the resulting mixture. In the above reaction, the reactivity of the compound of [II] is weakened with an increase of its molecular weight, and when the compound of formula [III] is a higher aldehyde or ketone, the reaction tends to proceed gradually. When the temperature is not elevated by reaction, it is preferable to heat the reaction mixture externally. However, in general, the reaction is exothermic, and hence, the reaction is allowed to proceed while cooling the mixture at a temperature of 0° to 20°C. and at the end of the reaction, the reaction mixture is preferably heated at a temperature of 50° to 120°C. to complete the reaction. The reaction is, usually, effected in the absence of a solvent, though an inert organic solvent, such as an aromatic hydrocarbon, for example, benzene, toluene or the like; an aliphatic hydrocarbon, for example, n-hexane; or an aliphatic halohydrocarbon, for instance, methylene chloride, carbon tetrachloride, 1,2-dichloroethane or the like may be used if necessary. After the completion of the reaction, the chloroalkyl compounds produced as by-products are distilled off at ordinary pressure or under reduced pressure to obtain almost quantitatively the desired organic phosphorosilicon compound.

The organic phosphorosilicon compounds of the present invention are viscous, substantially colorless and transparent liquids, and have been confirmed to have the structure represented by formula [I] by infrared absorption spectrum (peculiar absorption, such as $\gamma = (P = O)$, $\gamma = (P—O—C)$ and the like, have been confirmed), elementary analysis and reflective index. Examples of the present compound having formula [I] are as shown in Table 1.

TABLE 1

| Structural formula | Refractive index | Specific gravity |
|---|---|---|
| Si—[O CHP(O)(O CH$_2$CH$_2$Cl)$_2$ / CH$_3$]$_4$ | 1.480 | 1.411 |
| Si—[O CHP(O)(O CH$_2$CH$_2$Cl)$_2$ / CH$_2$CH$_3$]$_4$ | 1.475 | 1.396 |
| ClCH$_2$CH$_2$OSi—[O CHP(O)(O CH$_2$CH$_2$Cl)$_2$ / CH$_3$]$_3$ | 1.479 | 1.407 |
| (ClCH$_2$CH$_2$O)$_2$Si—[O CHP(O)(O CH$_2$CH$_2$Cl)$_2$ / CH$_3$]$_2$ | 1.477 | 1.403 |
| (ClCH$_2$CH$_2$O)$_3$SiO—C(CH$_3$)(H)—P(O)(O CH$_2$CH$_2$Cl)$_2$ | 1.472 | 1.392 |
| (ClCH$_2$CH$_2$O)Si—[O C(CH$_3$)$_2$ P(O)(O CH$_2$CH$_2$Cl)$_2$]$_3$ | 1.481 | 1.389 |
| ClCH$_2$CH$_2$O—Si—[O CHP(O)(O CH$_2$CHClCH$_2$Cl)$_2$ / CH$_3$]$_3$ | 1.492 | 1.427 |
| C$_6$H$_5$Si—[O CHP(O)(O C$_6$H$_5$)$_2$ / CH$_2$CH$_3$]$_3$ | 1.543 | — |
| (MeO)$_2$Si—[O CHP(O)(O CH$_2$CH$_2$Cl)$_2$ / CH$_3$]$_2$ | 1.471 | 1.358 |
| (ClCH$_2$CH$_2$O)$_2$Si—[O CHP(O)(O CH$_2$CH$_2$Cl)$_2$ / CH=CHCH$_3$]$_2$ | 1.485 | — |
| Si—[O CHP(O)(O CH$_2$CH$_2$Cl)$_2$ / CH=CH$_2$]$_4$ | 1.495 | 1.457 |
| (ClCH$_2$ClCHCH$_2$O)$_2$Si—[O CHP(O)(O CH$_2$CH$_2$Cl)$_2$ / CH$_3$]$_2$ | 1.481 | 1.425 |

TABLE 1

| Structural formula | Refractive index | Specific gravity |
| --- | --- | --- |
| $(ClCH_2CH_2O)_2Si\left[\begin{array}{c}C_2H_5\\-OC-P(O)(OCH_2CHClCH_2Cl)_2\\CH_3\end{array}\right]_2$ | 1.496 | 1.413 |
| $(ClCH_2CH_2O)_2Si\left[\begin{array}{c}-OCHP(O)(OCH_2CH_3)_2\\CH_2CH_3\end{array}\right]_2$ | 1.453 | 1.271 |
| $(CH_2=CHCH_2O)_2Si\left[\begin{array}{c}CH_3\\-OC-P(O)(OCH_2CH_2Cl)_2\\CH_3\end{array}\right]_2$ | 1.472 | 1.321 |

The compound having formula [I] of the present invention can be used as a flame-retarding agent for inflammable polymeric composition, such as synthetic resins, for example, polyurethanes, polymethacrylates, polyesters, polyolefins, polystyrene and the like, coating compositions, containing these resins (foaming or non-foaming), fibers, rubbers, waxes and celluloses including ethyl cellulose, nitro-cellulose and acetyl cellulose. Although the amount of said compound used as flame-retarding agent is not particularly restricted, said compound may preferably added in an amount within a range of 1 to 25 percent by weight according to the purpose of use of the composition. The compound of formula [I] is particularly effective for polyurethanes and polyesters. For example, it may be mixed in a proportion of 1 to 15 percent by weight with a polyester resin, and the resulting cured composition has a burning speed decreased in proportion to an increase in amount of the compound added. When 15 percent by weight of the compound is mixed with a polyester resin, the resin shows self-extinguishing property.

In general, polymethacrylates, polyurethane and polyolefins, when burnt, are melted and flow. However, when they are mixed with the compound of formula [I], the resulting mixture is not melted and maintains its original form even at high temperatures, and if it is burnt, the burning speed is very low, and the original form remains as it is even after burning. However, such characteristics have never been observed in conventional flame-retarding agents comprising an organophosphorus compound, but only in the present flame-retarding agent.

The present invention is further illustrated by the following Examples.

EXAMPLE 1

Production of tris { [2-bis(2-chloroethyl)-phosphonyl]-2-propyl } -β-chloroethoxy silane.

60.0 g. (0.223 mole) of tris-(2-chloroethyl)-phosphite was mixed with 15.8 g. (0.074 mole) of 2-chloroethoxy-trichlorosilane, and into the resulting mixture was dropped 13.0 g. (0.24 mole) of acetone while cooling the mixture with water at a temperature of 10° to 15°C. After the completion of the dropping, the reaction mixture was gradually heated and stirred at 40°C. for 4.5 hrs. to complete the reaction. Slight amounts of unreacted tris-(2-chloroethyl)-phosphite and acetone were thereafter removed from the mixture and then the remaining reaction product was subjected to distillation at 160°C/2mm. to obtain almost quantitatively 66.0 g. of tris { 2- [bis-(2-chloroethyl-phosphonyl] -2-propyl } -β-chloroethoxy silane ($n_D^{25}$ 1.481; $d_{25}$ 1.389) having the following structural formula:

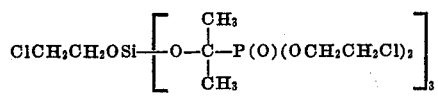

Elementary analysis

|  | Chlorine | Phosphorus |
| --- | --- | --- |
| Calc. (%) | 27.63 | 10.38 |
| Found (%) | 28.9 | 9.9 |

EXAMPLE 2

Production of bis-(2-chloroethoxy)-silane of diethyl-1-hydroxypropylphosphonate 40.0 g. (0.241 mole) of triethyl phosphite was mixed with 14.0 g. (0.242 mole) of propionaldehyde while cooling with ice water, and into the resulting mixture was dropped 30.0 g. (0.116 mole) of bis-(2-chloroethoxy) dichlorosilane while cooling the mixture at a temperature of 0° to 5°C. to react them. After the completion of the dropping, the mixture was gradually heated to 55°C., at which temperature the mixture was stirred for 30 min. to complete the reaction. The reaction product was treated in the same manner as in Example 1 to obtain bis-(2-chloroethoxy)-silane of diethyl-1-hydroxypropyl phosphonate ($n_D^{25}$ 1.455; $d_{25}$ 1.271) having the following formula:

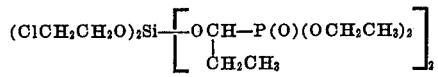

Elementary analysis

|  | Chlorine | Phosphorus |
| --- | --- | --- |
| Calc. (%) | 11.51 | 10.04 |
| Found (%) | 12.0 | 9.8 |

EXAMPLE 3

Production of monomethylsilane of bis-(2-chloroethyl)-2-hydroxylpropylphosphonate 17.7 g. (0.305 mole) of acetone was gradually added to a mixture of 14.9 g. (0.099 mole) of methyltrichlorosilane and 80.8 g. (0.300 mole) of tris-(2-chloroethyl)phosphite at a temperature of 0° to 5°C. The resulting reaction product was treated in the same manner as in Example 1 to obtain 82.5 g. of a monomethylsilane of bis-(2-chloroethyl)-2-hydroxypropylphosphonate ($n_D^{25}$ 1.472) having the formula:

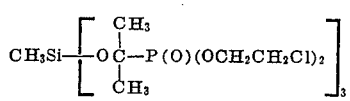

Elementary analysis

|  | Chlorine | Phosphorus |
|---|---|---|
| Calc. (%) | 28.98 | 12.65 |
| Found (%) | 29.04 | 12.01 |

EXAMPLE 4

Production of tetrakis [1-(1,2-propylenephosphonyl)-benzyl]-silicate 186.0 g. (1.01 moles) of 2-β-chloroethoxy-4-methyl-1,3,2-dioxaphospholane was reacted with 107.0 g. (1.01 moles) of benzaldehyde, and 42.5 g. (0.25 mole) of silicon tetrachloride was gradually dropped into the resulting reaction mixture at a temperature of 20° to 25°C. After the stop of heat-generation, the reaction mixture was gradually heated to a temperature of 75° to 80°C., at which the mixture was stirred for 1.5 hrs. to complete the reaction. The ethylene chloride produced as by-product was distilled off and the remaining product was concentrated at 150°C/4 mmHg to remove unreacted materials, thereby obtaining 234.0 g. of a colorless, transparent tetrakis- [1-(1,2-propylenephosphonyl)- benzyl] -silicate ($n_D^{20}$ 1.520; $d_{25}$ 1.333) having the following structural formula:

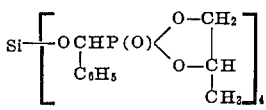

Elementary analysis

|  | Phosphorus |
|---|---|
| Calcd. (%) | 11.97 |
| Found (%) | 11.88 |

EXAMPLE 5

Production of 2-propyl-1,2-propylenephosphinyl-trimethylsilane 54.3 g. (0.50 mole) of trimethylchlorosilane was mixed with 118.0 g. (0.50 mole) of 2-(2,3-dichloropropoxy)-4-methyl-1,2-dioxaphospholane while cooling them, and 29.0 g. (0.50 mole) of acetone was then dropped thereinto to effect reaction. After the completion of the dropping, the reaction mixture was gradually heated to a temperature of 60° to 65°C., at which stirring was continued for 1 hour to complete the reaction. The trichloropropane produced as by-product and the excess phospholane were distilled off to obtain 125.0 g. of 2-propyl-1,2-propylenephosphonyl trimethylsilane having the following structural formula:

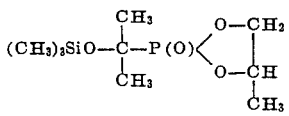

Elementary analysis

|  | Phosphorus |
|---|---|
| Calcd. (%) | 12.25 |
| Found (%) | 12.27 |

EXAMPLE 6

Production of bis [(3-chloropropylenephosphonyl)-1-allyl] -bis-β-chloroethoxy silane 186.0 g. (1.01 moles) of 2-ethoxy-4-chloromethyl-1,3,2-dioxaphospholane and 124.0 g. (1.01 moles) of bis-(β-chloroethoxy) silane were mixed at a low temperature, and 56.5 g. (1.01 moles) of acrolein was dropped into the resulting mixture while cooling the same at a temperature of 5° to 10°C. to effect reaction. After the completion of the dropping, the reaction mixture was gradually heated to a temperature of 60° to 70°C., at which the reaction mixture was stirred for 1.5 hrs. to complete the reaction. The ethyl chloride produced as by-product and the slightly excess phospholane were removed to obtain 304.0 g. of bis-[(3-chloropropylene-phosphonyl)-1-allyl] -bis-β-chloroethoxy silane having the following structural formula:

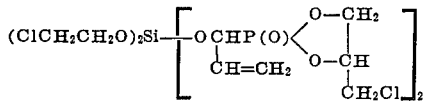

Elementary analysis

|  | Phosphorus | Chlorine |
|---|---|---|
| Calcd. (%) | 10.16 | 23.28 |
| Found (%) | 9.97 | 23.30 |

EXAMPLE 7

Production of tetrakis- [(3-propylenephosphonyl)-1-ethyl] silicate

In the same manner as in Example 4, 186.0 g. (1.01 moles) of 2-β-chloroethoxy-4-methyl-1,3,2-dioxaphospholane was mixed with 42.5 g. (1.06 moles) of silicon tetrachloride while being cooled with water, after which 46.6 g. (1.06 moles) of acetaldehyde was added thereto to effect reaction. After the completion of addition, the reaction mixture was gradually heated to a temperature of 80° to 85°C., at which the mixture was stirred for 1 hour to complete the reaction. The ethylene chloride produced as by-product was thereafter removed under reduced pressure and the remainder was then concentrated at 150°C/4 mmHg to remove unreacted materials, whereby 171.5 g. of tetrakis- [(3-propylenephosphonyl)-ethyl] silicate ($n_D^{20}$ 1.520; $d_{25}$ 1.384) having the following structural formula was obtained:

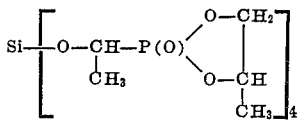

Elementary analysis

| | Phosphorus |
|---|---|
| Calcd. (%) | 15.02 |
| Found (%) | 17.94 |

EXAMPLE 8

Four equivalents of tris-(2-chloroethyl)-phosphite was mixed with four equivalents of acetone, after which one equivalent of silicon tetrachloride was dropped into the resulting mixture at a low temperature to effect reaction. The resulting product was a viscous, colorless, transparent compound, which was tetrakis-{[bis-(2-chloroethoxy)-phosphonyl]-2-propyl} -silicate ($n_D^{25}$ 1.485; $d_{25}$ 1.373) having the following structural formula:

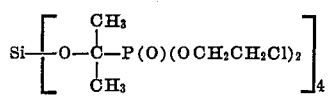

Elementary analysis

| | Phosphorus | Chlorine |
|---|---|---|
| Calcd. (%) | 11.44 | 26.19 |
| Found (%) | 11.38 | 26.20 |

100 g. of a polyurethane having the composition shown in Table 2 was mixed with said compound in an amount of 7.5 g., 10.0 g. or 15.0 g. The resulting mixture was stirred at a speed of about 2,000 r.p.m. for 15 min., and then placed in a vessel (20 cm × 14 cm × 3 cm), in which foaming was effected and the foamed product was then allowed to stand at 50°C. for 30 min. The resulting polymerized foamed polyurethane was shaped into a size of 15 cm × 10 cm × 2 cm, which was subjected to a test according to Japanese Industrial Standards (J.I.S.) A-1322-1966 to obtain results as shown in Table 3.

TABLE 2

| | Component | Amount (g) |
|---|---|---|
| A liquid | Commercially available polyether | 114.0 |
| B liquid | Polyphenyl isocyanate | 100.0 |
| | Dimethylethanolamine | 0.5 |
| | Monofluorotrichloromethane | 40.0 |
| | Silicone oil | 1.3 |
| | Stabilizing agent | 0.5 |

TABLE 3

| Amount of compound (g.) | 7.5 | 10 | 10 | 15 | 15 |
|---|---|---|---|---|---|
| Heating time (sec.) | 5 | 5 | 10 | 5 | 10 |
| Self-extinguishing time (sec.) | 3.0 | 3.0 | 3.0 | 1.6 | 3.4 |

The test sample was heated for 5 or 10 sec. and the self-extinguishing time (burning-continued time) was determined. An additive-free polyurethane ignited in 25 sec. and was not self-extinguished.

EXAMPLE 9

186.0 g. (1.01 moles) of 2-β-chloroethoxy-4-methyl-1,3,2-dioxaphospholane, 60.0 g. (1.03 moles) of acetone and 42.5 g. (0.25 mole) of silicon tetrachloride were reacted with each other in the same manner as in Example 8 to obtain tetrakis- [(1,2-propylenephosphonyl)-2-propyl] -silicate ($n_D^{25}$ 1.474; $d_{25}$ 1.332) having the following structural formula:

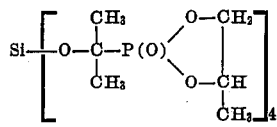

Elementary analysis

| | Phosphorus |
|---|---|
| Calcd. (%) | 16.67 |
| Found (%) | 16.61 |

100 g. of an uncured unsaturated polyester resin having the composition shown in Table 4 was mixed with said compound in an amount of 7.5 g., 10.0 g. or 15.0 g., and the resulting mixture was placed in a vessel of 20 cm × 14 cm × 3 cm, in which the mixture was allowed to stand overnight. The mixture was thereafter cured at 80°C. for 2 hrs. The thus cured polyester resin was shaped into a size of 0.2 cm × 1.0 cm × 3.0 cm and then subjected to a burning test, which was carried out as follows: A top of a test sample was contacted with the top of a Bunsen burner flame (7 cm) to heat the sample for a given time, and its self-extinguishability was examined, whereby a heating time range at which the sample was self-extinguishable was determined. The results obtained were as shown in Table 5, in which for comparison, the result of tris-(2,3-dichloropropyl)-phosphate is also shown.

TABLE 4

| Component | Amount (g.) |
|---|---|
| Unsaturated polyester resin | 100.0 |
| Dimethylketone peroxide | 1.0 |
| Cobalt naphthenate | 0.1 |

TABLE 5

| Amount of flame-retarding agent (g.) | 7.5 | 10 | 15 |
|---|---|---|---|
| Heating time (sec.) | 5–10* | 8–13* | 8–19** |
| Comparison | 5–9* | 6–9* | 8–15* |

Note: * When heating time was shorter than the range, the burnt sample was instantly extinguished, while when heating time was within the range, the burnt sample was extinguished within 20 sec. 6 ** When heating time was within the range, the burnt sample was instantly extinguished.
When an additive-free sample was heated for more than 4 sec., the sample was not self-extinguished.

EXAMPLE 10

The silicate of hydroxyphosphonate obtained in Example 8 (A) and a tris- {[bis-(β-chloroethoxy) phosphonyl-2-propyl]}β-chloroethoxy silane ($n_D^{25}$ 1.481) (B) obtained by reacting 2-chloroethoxy-trichlorosilane, acetone and tris-(2-chloroethyl) phosphite in the same manner as in Example 8 were each mixed in an amount of 5 g., 10 g., 15 g. or 20 g. with 100 g. of methyl methacrylate prepolymer, and the resulting mixture was heated at a temperature of 105° to 110°C. for a period of 1 to 1.5 hrs. to form a methacrylate polymer plate. The resulting plate was shaped into a test sample of a thickness of 3 mm. and a width of 10 mm. This sample was subjected to a burning test according to A.S.T.M. D-635-63. That is, a top of the sample was contacted with the top of a Bunsen burner flame to burn the sample and a time until the burning reached a given length of the sample (50 cm.) was determined. The results obtained are as shown in Table 6.

TABLE 6

| Amount of (A) or (B) (g.) | 0 | 5 | 10 | 15 | 20 |
|---|---|---|---|---|---|
| Burning speed of (A) (m/sec.) | 0.54 | 0.34 | 0.32 | 0.18 | 0.16 |
| Burning speed of (B) (m/sec.) |  | 0.35 | – | 0.25 |  |

What we claim is:

1. A flame-retarding composition, which comprises an inflammable cured resin obtained from an unsaturated polyester and an organic phosphorosilicon compound having the formula:

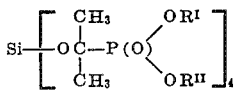

wherein $R'$ and $R''$ each are $\beta$-chloroethyl or when taken together, an alkylene or chlorine-substituted alkylene group having two to three carbon atoms.

2. A flame-retarding composition comprising an inflammable cured resin obtained from an unsaturated polyester and tetrakis-1,2-propylenephosphonyl-2-propyl silicate having the formula:

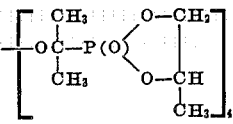

3. A flame-retarding composition comprising an inflammable cured resin obtained from an unsaturated polyester or polyurethane and tetrakis-(bis-2-chloroethoxyphosphonyl)-2-propyl silicate having the formula:

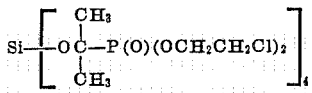

* * * * *